United States Patent Office
3,311,613
Patented Mar. 28, 1967

3,311,613
DERIVATIVES OF GLYCYRRHETINIC ACID AND PROCESS FOR THE PREPARATION THEREOF
William Alan McFarlane Davies, Ilford, England, assignor to Biorex Laboratories Limited, London, England
No Drawing. Filed Mar. 16, 1965, Ser. No. 440,290
Claims priority, application Great Britain, Mar. 24, 1964, 12,273/64
9 Claims. (Cl. 260—239.3)

The present invention is concerned with new derivatives of glycyrrhetinic acid, with the preparation thereof and with pharmaceutical compositions containing them.

It is an object of the present invention to provide new glycyrrhetinic acid derivatives which possess unexpectedly useful pharmacological properties and a degree of activity which could not have been predicted from a knowledge of their chemical structure.

I have now found that the 3-keto derivatives of 18α- and 18β-glycyrrhetinic acid and the esters thereof can be converted into their oximes and these then subjected to a Beckmann rearrangement to give cyclic amides and nitriles. I have also found that the cyclic amides can be hydrolysed to give amino acids and that the nitriles can also be hydrolysed to the corresponding carboxylic acids.

Thus, the new compounds of the present invention can be represented by the general formula:

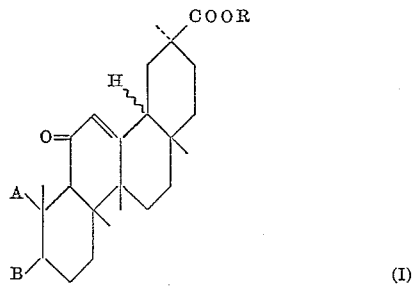

(I)

wherein R is a hydrogen atom or an alkyl radical and A is a β-cyanoethyl or β-carboxyethyl radical and B is an isoallyl radical or A is a β-carboxyethyl radical and B is an isopropylamino-(2) radical or A and B together form a 3-keto-4-aza-5,5-dimethyl-n-pentylene radical.

In the above-given general formula, R is preferably an alkyl radical containing up to 6 carbon atoms, such as a methyl, ethyl, n-propyl, isopropyl or n-hexyl radical.

The oxime of 3-keto-glycyrrhetinic acid methyl ester can be prepared, for example, by reacting the ester with hydroxylamine hydrochloride in dry pyridine. The Beckmann rearrangement of the oxime is carried out, for example, by the action of p-toluene-sulphonyl chloride, phosphorus oxychloride or phosphorus pentachloride in dry pyridine. A cyclic amide (VII) and a nitrile (VIII) are obtained. When the Beckmann rearrangement is carried out on an oxime containing a free 30-oic acid group, then the corresponding acid anhydride is formed. However, this anhydride is readily hydrolysed to the free acid.

Hydrolysis, preferably in an alkaline medium, of the cyclic amide (VII) results in the formation of an amino acid (IX). At the same time, hydrolysis of the ester grouping also takes place.

The nitrile (VIII) can also be hydrolysed, again preferably in an alkaline medium, whereby there is formed the corresponding dicarboxylic acid (X). Here again, the ester grouping is saponified.

It is to be understood that where reference is made to glycyrrhetinic acid, both the 18α- and the 18β-isomers are intended.

The reactions which take place are illustrated by the following equation:

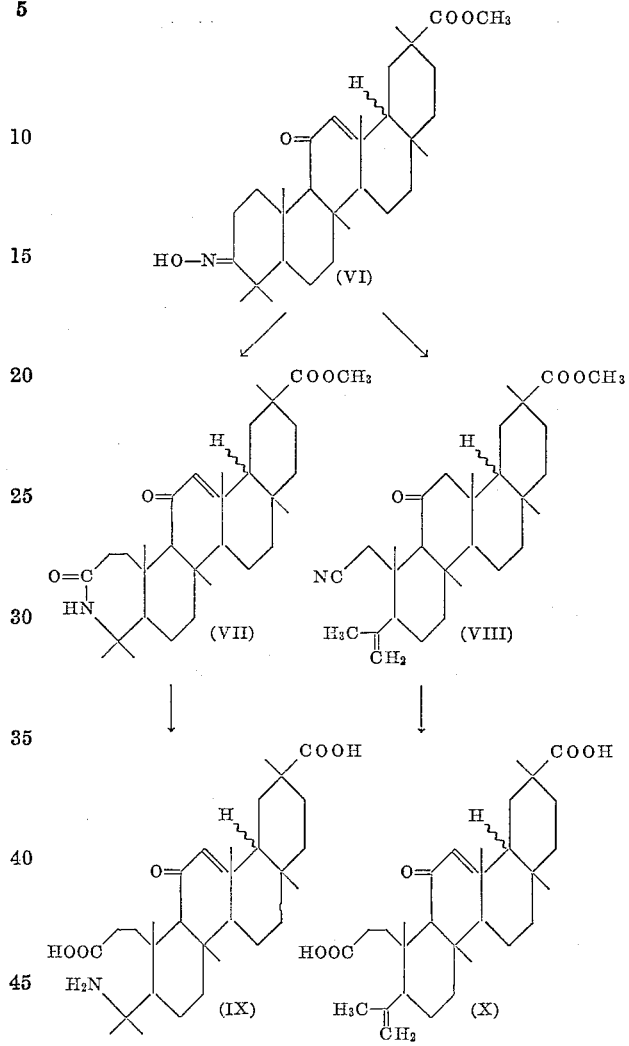

The following examples are given for the purpose of illustrating the present invention:

EXAMPLE 1

Methyl 3-oximino-11-oxo-18β-olean-12-en-30-oate

A warm solution of 9.1 g. hydroxylamine hydrochloride in 60 cc. dry pyridine is added to a suspension of 42 g. pure methyl 3,11-dioxo-18β-olean-12-en-30-ate in 140 cc. dry pyridine. The resulting solution is heated on a steam bath for 30 minutes, with occasional swirling. After cooling to about 50° C., the solution is poured, with vigorous stirring, into 1 litre cold distilled water. The white oxime which precipitates is filtered off with suction, thoroughly washed with water and pressed dry. After drying in a vacuum at 100° C., prolonged heating being avoided, 43 g. of the crude oxime are obtained and are dissolved in a boiling mixture of 1 litre ethanol and 400 cc. chloroform. The solution is evaporated until crystallisation starts and then cooled to room temperature. The pure 3-oximino-glycyrrhetinic acid methyl ester which crystallises out, is filtered off, washed with ethanol and then with petroleum ether (B.P. 40–60° C.) and dried at 100° C. There are obtained 38 g. of the pure methyl-3-oximino-11-oxo-18β-olean-12-en-30-oate, corresponding to a theoretical yield of 88%. The compound has a melting point of 288–289° C., which agrees with the melting point, given by Karuno, of 288.5° C. (v. supra); $[\alpha]_D^{20} = +107°$ (c.=1% in chloroform).

*Analysis.*—$C_{31}H_{47}NO_4$ (M.W. 498. Calc.: C, 74.8%; H, 9.5%; N, 2.8%. Found: C, 74.3%; H, 9.5%; N, 3.0%.

EXAMPLE 2

*3-oximino-11-oxo-18β-olean-12-en-30-oic acid*

20 g. 3,11-dioxo-18β-olean-12-en-30-oic acid and 4 g. hydroxylamine hydrochloride in 100 ml. pyridine are heated on a steam bath for 30 minutes, with occasional swirling. 100 ml. hot water are then added slowly and the material which separates is collected, washed with hot water and dried at 80° C. in a vacuum. Recrystallisation from cloroform-ethanol gives 17 g. 3-oximino-11-oxo-18β-olean-12-en-30-oic acid melting at 314–315° C. (decomp.); $[\alpha]_D^{20} = +141 \pm 1°$ (c.=1% in dimethyl formamide).

*Analysis.*—$C_{30}H_{45}NO_4$ (M.W. 484). Calc.: C, 74.5%; H, 9.4%; N, 2.9%. Found: C, 74.2%; H, 9.4%; N, 3.1%.

EXAMPLE 3

*3-oximino-11-oxo-18α-olean-12-en-30-oic acid*

Starting from 3,11-dioxo-18α-olean-12-en-30-oic acid and using the same method as described in Example 2, there is obtained 3-oximino-11-oxo-18α-olean-12-en-30-oic acid which has a melting point of 309–310° C.; $[\alpha]_D^{20} = 72 \pm 1°$ (c.=1% in dimethyl formamide).

*Analysis.*—$C_{30}H_{45}NO_4$ (M.W. 484). Calc.: C, 74.5%; H, 9.4%; N, 2.9%. Found: C, 74.1%; H, 9.35%; N, 3.1%.

EXAMPLE 4

*Methyl 3-oximino-11-oxo-18β-olean-12-en-30-oate*

Starting from methyl 3,11-dioxo-18β-olean-12-en-30-oate and using the same method as described in Example 2, there is obtained methyl 3-oximino-11-oxo-18β-olean-12-en-30-oate (cf. Example 1) which has a melting point of 290–291° C.; $[\alpha]_D^{20} = +106.5 \pm 1°$.

*Analysis.*—$C_{31}H_{47}NO_4$ (M.W. 498). Calc.: C, 74.8%; H, 9.5%; N, 2.8%. Found: C, 74.3%; H, 9.5%; N, 3.0%.

EXAMPLE 5

*Methyl 3-oximino-11-oxo-18α-olean-12-en-30-oate*

Starting from methyl 3,11-dioxo-18α-olean-12-en-30-oate and using the same method as described in Example 1, there is obtained methyl 3-oximino-11-oxo-18α-olean-12-en-30-oate which has a melting point of 291–292° C.; $[\alpha]_D^{20} = +51.5 \pm 1°$.

*Analysis.*—$C_{31}H_{47}NO_4$ (M.W. 498). Calc.: C, 74.8%; H, 9.5%; N, 2.8%. Found: C, 74.7%; H, 9.45%; N, 3.0%.

EXAMPLE 6

*Beckmann rearrangement of methyl 3-oximino-11-oxo-18β-olean-12-en-30-oate*

A cold solution of 16 g. p-toluene sulphonyl chloride in 50 cc. dry pyridine is added to a suspension of 20 g. pure methyl 3-oximino-11-oxo-18β-olean-12-en-30-oate, prepared as described in Example 1, in 100 cc. dry pyridine. After standing for about 5 minutes at room temperature, with occasional swirling, a clear solution is obtained. This solution is left to stand at room temperature for about 16 hours.

After this time, the yellow solution is cooled to 0° C., cautiously treated with ice to hydrolyse excess p-toluene sulphonyl chloride, poured into a mixture of 200 cc. concentrated hydrochloric acid, 400 cc. ice water and about 200 cc. chloroform contained in a separating funnel and thoroughly shaken. The organic layer is separated and washed successively with 200 cc. 2 N hydrochloric acid, 200 cc. water, 200 cc. 2 N sodium carbonate solution and again with 200 cc. water.

The chloroform solution is then boiled with 0.5 g. charcoal for a few minutes, cooled, dried, over anhydrous sodium sulphate, filtered and evaporated to dryness. The residual solid is then taken up in about 100 cc. boiling ethanol and the solution slowly cooled to 0° C. Colourless crystals of the cyclic amide (VII), i.e. methyl 3b-aza-A-homo-11-oxo-18β-olean-12-en-30-oate, separate and are filtered off with suction; yield 13 g. The mother liquor is evaporated to dryness and the residue extracted with 100 cc. boiling ethyl acetate and cooled at room temperature. A further 2.3 g. of the insoluble cyclic amide (VII) are obtained.

The total yield of cyclic amide (VII), which is 15.3 g. and represents about 76% of the theoretical yield, is dissolved in ethanol, boiled with charcoal, filtered and treated with hot water, while continuing to boil, until crystallisation begins. Upon cooling, the cyclic amide separates out in the form of colourless hexagonal plates with a melting point of 280–282° C.; yield 14.0 g.; $[\alpha]_D^{20} = +173 \pm 1°$ (c.=1% in chloroform). Infra-red absorption (Nujol mull): 3220 (NH), 1722 (ester CO), 1662 and 1655 (amido CO and α,β-unsaturated ketonic CO) and 1620 (C=C). The compound is insoluble in water and soluble in ethanol and chloroform.

*Analysis.*—$C_{31}H_{47}SO_4$ (M.W. 498). Calc.: C, 74.8%; H, 9.5%; N, 2.8%. Found: C, 75.0%; H, 9.6%; N, 2.9%.

The ethyl acetate extract obtained above contains the nitrile (VIII), i.e. methyl 3-cyano-3,4-seco-11-oxo-18β-olean-4(23),12-dien-30-oate. The solution is passed through a column of silica gel and the nitrile eluted with ethyl acetate. There are obtained 2.5 g. of the pure nitrile (VIII) which corresponds to a yield of 13% of theory. After recrystallisation from ethyl acetate-petroleum ether (B.P. 80–100° C.), the nitrile is obtained in the form of colourless needles melting at 190.5–191° C.; $[\alpha]_D^{20} = +157.5 \pm 1°$ (c.=1% in chloroform). Infra-red absorption (Nujol mull): 2250 (CN) and 905 ($CH_2$=C).

*Analysis.*—$C_{31}H_{45}NO_3$ (M.W. 480). Calc.: C, 77.6%; H, 9.5%; N, 2.9%. Found: C. 77.7%; H, 9.4%; N, 3.0%.

EXAMPLE 7

*Beckmann rearrangement of methyl 3-oximino-11-oxo-18β-olean-12-en-30-oate*

20 g. methyl 3-oximino-11-oxo-18β-olean-12-en-30-oate, obtained as described in Example 1, are suspended in 100 ml. anhydrous pyridine and mixed with a solution of 16 g. p-toluene sulphonyl chloride in 50 ml. anhydrous pyridine. After 5 minutes, with occasional swirling, the clear solution obtained is left to stand at room temperature for 16 hours, then cooled, mixed with 200 g. ice and 400 ml. 5 N hydrochloric acid and shaken with 200 ml. chloroform. The chloroform layer is separated, washed with dilute hydrochloric acid, then with water, dried over anhydrous sodium sulphate and then evaporated to dryness. The solid residue is stirred with hot ethyl acetate and the insoluble part separated and recrystallised from methanol. There are thus obtained 15.3 g. methyl 3b-aza-A-homo-11-oxo-18β-olean-12-en-30-oate (VIII) which melts at 282–283° C.; $[\alpha]_D^{20} = +173 \pm 1°$ (c.=1% in chloroform).

*Analysis.*—$C_{31}H_{47}NO_4$ (M.W. 498). Calc.: C, 74.8%; H, 9.5%; N, 2.8%. Found: C, 75.0%; H, 9.6%; N, 2.9%.

The ethyl acetate extract obtained (see above) is introduced into a silica gel column and eluted with ethyl acetate. The eluate is evaporated to dryness and the residue recrystallised from ethyl acetate-petroleum ether (B.P. 80–100° C.) to give 2.9 g. methyl 3-cyano-3,4-seco-11-oxo-18β-olean-4(23),12-dien-30-oate (VIII) melting at 190–191° C.; $[\alpha]_D^{20} = +158 \pm 1°$ (c.=1% in chloroform).

Analysis.—$C_{31}H_{45}NO_3$ (M.W. 480). Calc.: C, 77.6%; H, 9.5%; N, 2.9%. Found: C, 77.7%; H, 9.4%; N, 3.0%.

EXAMPLE 8

*Beckmann rearrangement of methyl 3-oximino-11-oxo-18α-olean-12-en-30-oate*

A solution of 20 g. methyl 3-oximino-11-oxo-18α-olean-12-en-30-oate and 16 g. p-toluene sulphonyl chloride in 150 ml. anhydrous pyridine is kept at room temperature for 16 hours. 200 g. ice and 400 ml. 5 N hydrochloric acid are then added and the reaction mixture shaken with 200 ml. chloroform. The organic layer is separated and washed with dilute hydrochloric acid and then with water, dried over anhydrous sodium sulphate and evaporated to dryness. Crystallization of the residue from methanol, after charcoal clarification, gives 15 g. methyl 3b-aza - A-homo-11-oxo-18α-olean-12-en-30-oate (VII) which melts at 293–294° C.; $[\alpha]_D^{20} = +109 \pm 1°$.

Analysis.—$C_{31}H_{47}NO_4$ (M.W. 498). Calc.: C, 74.8%; H, 9.5%; N, 2.8%. Found: C, 75.1%; H, 9.5%; N, 2.9%.

The residue from the methanolic mother liquor was chromatographed on alumina using methylene chloride as eluent. Crystallisation of the main component from ethyl acetate-petroleum ether (B.P. 80–100° C.) gives 3.5 g. methyl 3-cyano-3,4-seco-11-oxo-18α-olean-4(23),12-dien-30-oate (VIII); melting point 197–198° C.; $[\alpha]_D^{20} = +96.5 \pm 1°$.

Analysis.—$C_{31}H_{45}NO_3$ (M.W. 480). Calc.: C, 77.6%; H, 9.5%; N, 2.9%. Found: C, 77.7%; H, 9.4%; N, 3.0%.

EXAMPLE 9

*Beckmann rearrangement of 3-oximino-11-oxo-18β-olean-12-en-30-oic acid*

A suspension of 30 g. 3-oximino-11-oxo-18β-olean-12-en-30-oic acid in 200 ml. anhydrous pyridine is treated with a solution of 35.5 g. p-toluene sulphonyl chloride in 100 ml. anhydrous pyridine at 5° C. After 2 hours, the reaction mixture is warmed to room temperature and, after a further 16 hours, treated with 300 g. ice and 600 ml. 5 N hydrochloric acid and shaken with chloroform. The chloroform layer is separated, washed with dilute hydrochloric acid and then with water and evaporated to dryness. The residue is boiled for 10 minutes with a mixture of 100 ml. 1 N sodium hydroxide solution and 60 ml. ethanol, diluted with 500 ml. water, heated to boiling point, clarified with charcoal and filtered. The filtrate is acidified with hydrochloric acid, the precipitate formed filtered off, washed with water, dried and dissolved in a mixture of equal parts of methanol and toluene. Concentration of this solution gives 15 g. 3b-aza-A-homo-11-oxo-18β-olean-12-en-30-oic acid in the form of a crystalline solid melting above 350° C.; $[\alpha]_D^{20} = +186 \pm 1°$ (c.±1% in chloroform).

Analysis.—$C_{30}H_{45}NO_4$ (M.W. 484). Calc.: C, 74.5%; H, 9.4%; N, 2.9%. Found: C, 74.6%; H, 9.4%; N, 2.8%.

EXAMPLE 10

*Beckmann rearrangement of 3-oximino-11-oxo-18α-olean-12-en-30-oic acid*

Starting from 3-oximino-11-oxo-18α-olean-12-en-30-oic acid and using the same method as described in Example 9, there is obtained 3b-aza-A-homo-11-oxo-18α-olean-12-en-30-oic acid which melts above 350° C.; $[\alpha]_D^{20} = +122 \pm 1°$ (c.=1% in chloroform) .

Analysis.—$C_{30}H_{45}NO_4$ (M.W. 484). Calc.: C, 74.5%; H, 9.4%; N, 2.9%. Found: C, 74.2%; H, 9.4%; N, 3.1%.

EXAMPLE 11

*Hydrolysis of methyl 3-cyano-3,4-seco-11-oxo-18α-olean-4(23),12-dien-30-oate*

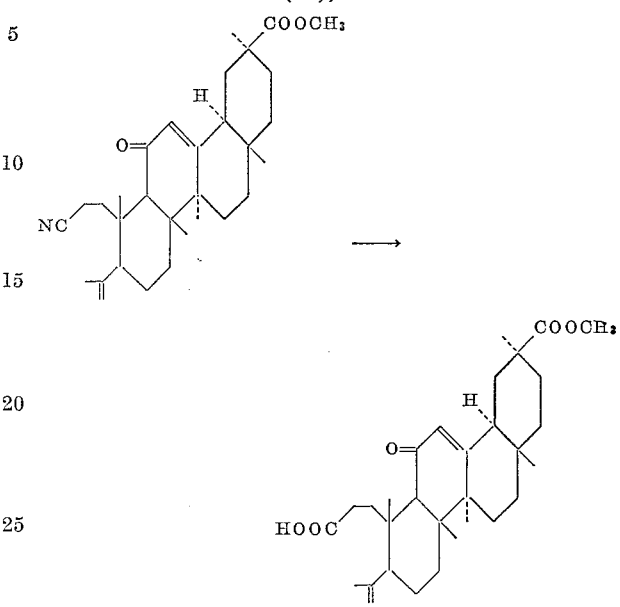

0.765 g. of the cyano ester are dissolved in 20 cc. of a 20% solution of potassium hydroxide in ethanol and heated under reflux on a steam bath for 3 hours. The yellow solution obtained is then diluted with water, acidified with 2 N hydrochloric acid and the crude dicarboxylic acid of the above-given formula which separates is filtered off, washed with water and dried at 100° C. It is purified by dissolving in hot 1:1 ethanol-methylene chloride and concentrating the solution by distillation, when colourless needles of 3,4-seco-11-oxo-18α-olean-4(23),12-dien-3,30-dioic acid (0.65 g.) are obtained having a melting point of about 350° C. (decomp.); $[\alpha]_D^{20} = +64.5 \pm 1°$ (c.=1% in dimethyl formamide).

Analysis.—$C_{30}H_{44}O_5$ (M.W. 485). Calc.: C, 74.35%; H, 9.15%. Found: C, 73.9%; H, 9.2%.

EXAMPLE 12

*Hydrolysis of 3b-aza-A-homo-11-oxo-18α-olean-12-en-30-oic acid*

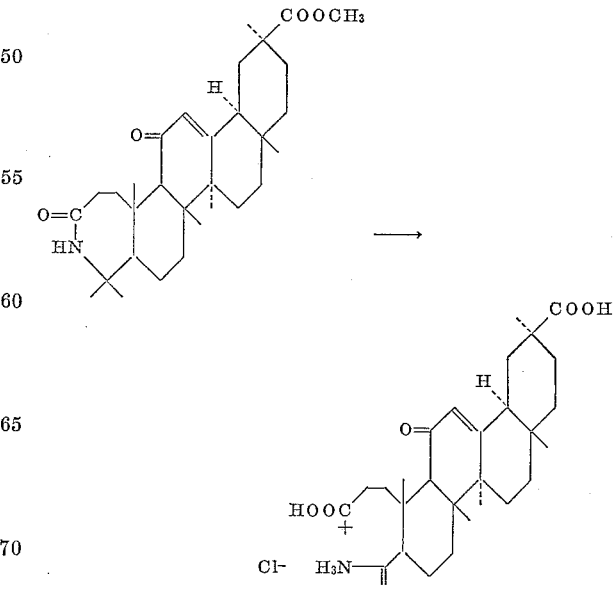

5 g. of the lactam are dissolved in a hot solution of 5 g. potassium hydroxide in 25 cc. ethylene glycol and heated for 4 hours at 190° C. (bath temperature) in an atmosphere of nitrogen. The solution is cooled, diluted with 100 cc. water and 100 cc. 2 N hydrochloric acid are added, with stirring. The crude amino acid hydrochloride of the above-given formula which separates, is filtered off, wash with 2 N hydrochloric acid and dried in vacuo at room temperature. The product is boiled with about 500 cc. water and 0.5 g. charcoal for 5 minutes, the mixture filtered and a 10% sodium chloride solution added to the hot filtrate until the hydrochloride starts to separate. After cooling to 0° C., the solid is filtered off and dried in vacuo at room temperature. Further crystallisation from ethanol-ether gives 4-amino-3,4-seco-11-oxo-18α-olean-12-en-3,30-dioic acid in the form of a colourless solid which, after drying, has a melting point of 238–240° C. (decomp.); $[\alpha]_D^{21} = +19 \pm 1°$ (c.=1% in methanol).

Analysis.—$C_{30}H_{48}ClNO_5$ (M.W. 538.2). Calcd.: C, 66.9%; H, 9.0%; Cl 6.6%; N, 2.6%. Found: C, 66.6%; H, 9.0%; Cl, 6.2%; N, 2.7%.

The new glycyrrhetinic acid derivatives according to the present invention possess valuable pharmacodynamic properties; in particular, they exhibit an extremely active, non-specific anti-inflamatory action with little or no analgesic or thymolytic effect.

For therapeutic purposes, the new compounds of the present invention can be used as such and those which are acidic or basic can also be used in the form of their salts. Thus, for example, the acidic compounds can be used in the form of their alkali metal or alkaline earth metal salts, such as the sodium, potassium or calcium salts, and the basic compounds can be used in the form of their salts with physiologically compatible inorganic or organic acids. Examples of such acids include hydrochloric acid, hydrobromic acid, sulphuric acid, phosphoric acid, acetic acid, propionic acid, succinic acid, citric acid and tartaric acid.

The present invention also includes within its scope pharmaceutical compositions containing one or more of the new compounds of general Formula I or, in the case of those compounds which are acidic or basic, the salts thereof. These pharmaceutical compositions can be administered orally or parenterally in admixture with a solid or liquid pharmaceutical carrier.

Solid compositions for oral administration include compressed tablets, pills, dispersible powders and granules. In such solid compositons, at least one active compound of general Formula I is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspenison agents and sweetening and flavouring agents.

The compositions according to the present invention, for oral administration, include capsules of absorbable material, such as gelatine, containing at least one of the active substances of general Formula I, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the desired therapeutic effect shall be obtained. In general, the preparations of the present invention should be administered, in the case of oral administration, to give 25 to 750 mg. of active substance per day and, in the case of parenteral administration, 10 to 500 mg. of substance per day.

The following examples illustrate pharmaceutical compositions according to the present invention.

EXAMPLE 13

200 mg. tablets are prepared containing:

Mg.
3b - aza - A - homo - 11 - oxo-18β-olean-12-en-30-oic acid _____ 50
Starch _____ 143
Magnesium stearate _____ 7

EXAMPLE 14

150 mg. tablets are prepared containing:

Mg.
4 - amino - 3,4 - seco - 11 - oxo - 18α - olean - 12 - en-3,30-dioic acid hydrochloride _____ 35
Starch _____ 85
Lactose _____ 25
Magnesium stearate _____ 5

I claim:
1. A member of the class consisting of glycyrrhetinic acid derivatives of the formula:

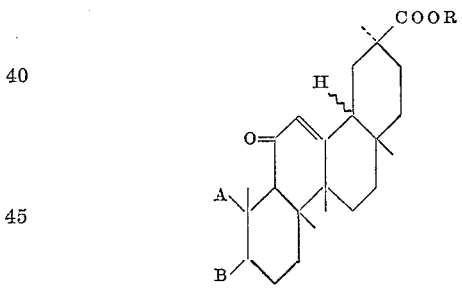

wherein R is a member selected from the group consisting of H and alkyl of up to and including 6 carbon atoms, and A is a member selected from the group consisting of β-cyanoethyl and β-carboxyethyl when B is isoallyl and A is β-carboxyethyl when B is isopropylamino-(2) and A and B together can also form 3-keto-4-aza-5,5-dimethyl-n-pentylene.

2. 3b-aza-A-homo-11-oxo-18α-olean-12-en-30-oic acid.
3. 3b-aza-A-homo-11-oxo-18β-olean-12-en-30-oic acid.
4. Methyl 3b-aza-A-homo-11-oxo-18α-olean-12-en-30-oate.
5. Methyl 3b-aza-A-homo-11-oxo-18β-olean-12-en-30-oate.
6. Methyl 3-cyano-3,4-seco-11-oxo-18β-olean-4(23),12-dien-30-oate.
7. Methyl 3-cyano-3,4-seco-11-oxo-18α-olean-4(23),12-dien-30-oate.
8. 3,4 - seco - 11 - oxo - 18α - olean - 4(23),12- dien - 3,30-dioic acid.
9. 4 - amino - 3,4 - seco - 11 - oxo - 18α - olean - 12 - en-3,30-dioic acid hydrochloride.

No references cited.

WALTER A. MODANCE, Primary Examiner.
ROBERT T. BOND, Assistant Examiner.